July 1, 1969 D. E. SPELIOTIS ET AL 3,453,646

MAGNETIC INFORMATION STORAGE UTILIZING AN ENVIRONMENTAL FORCE DEPENDENT COERCIVITY TRANSITION POINT OF FERROUS FERRITE

Filed May 26, 1965 Sheet 1 of 2

INVENTORS
JOHN K. ALSTAD
GEOFFREY BATE
JOHN R. MORRISON
DENNIS E. SPELIOTIS
BY John F. Osterndorf
ATTORNEY

United States Patent Office 3,453,646

Patented July 1, 1969

3,453,646

MAGNETIC INFORMATION STORAGE UTILIZING AN ENVIRONMENTAL FORCE DEPENDENT COERCIVITY TRANSITION POINT OF FERROUS FERRITE

Dennis E. Speliotis, Poughkeepsie, John R. Morrison, Wappingers Falls, John K. Alstad, Poughkeepsie, and Geoffrey Bate, Wappingers Falls, N.Y., assignors to International Business Machines Corporation, Armonk, N.Y., a corporation of New York Filed May 26, 1965, Ser. No. 458,950

Int. Cl. G01d *15/12*

U.S. Cl. 346—74 5 Claims

ABSTRACT OF THE DISCLOSURE

An information storage system for use with a magnetic storage medium which exhibits a sharp transition of a magnetic parameter between two levels, dependent on an incremental change in an applied environmental force. The system includes means for applying environmental force to a selected portion of the medium to cause it to exceed its transition point. Means, coincidental with the applied environmental force, are provided for applying a magnetic field to the medium. Where the applied environmental force and external magnetic field interact, the magnetic character of the storage medium is changed in a detectable manner.

This invention relates to information storage apparatus and, more particularly, to random access magnetic storage apparatus operable in response to externally applied magnetic and environmental forces.

Storage apparatus which depend on the combined effects of a magnetic field and an external force, such as temperature, are well known in the art. Examples of such apparatus are Curie point, superconductor and thermoplastic storage systems. In the superconductor type of system, high storage densities are difficult to achieve and expensive peripheral apparatus must be provided to create the temperature environment or conditions necessary for operation.

In the thermoplastic type of system, magnetic particles are disposed in a plastic medium. To accomplish information storage, a particular storage location of the medium is softened by the external application of heat. The deformations of the surface are read with an electron beam to determine the stored information. Since the softening of the plastic material does not occur sharply or abruptly, but rather occurs only over a range of 50° to 100° C., thermoplastic storage systems require lengthy access times to record information. In addition, the heating effects are not localized when the plastic medium is subjected to an external temperature source, but they are dissipated through the surrounding areas affecting the resolution of the stored information and the density of the stored data.

In Curie point writing, a magnetic medium is heated until the Curie region is reached. When this occurs, the magnetic characteristics of the material at this storage location are altered and information is stored by applying an external magnetic field. Similar broad temperature ranges of 50° to 100° C. are required to effect Curie point writing. Therefore, memories of this type are subject to the same disadvantages as thermoplastic systems.

Accordingly, it is a general object of the invention to provide improved random access magnetic storage apparatus operable in response to the combined effects of magnetic and environmental forces.

It is another object of the invention to provide magnetic storage apparatus responsive to magnetic and environmental forces to accomplish the storage of information at high densities with low accessing speeds and high resolution of the information.

Magnetic materials are known having well-defined transitions in their magnetic characteristics when subjected to environmental forces. These forces may take the form of pressure, temperature, stress, radiation, etc. These materials and the nature of these transitions have been described by D. E. Speliotis in his doctoral thesis submitted to the University of Minnesota in 1961.

It is, therefore, another object of the invention to employ these magnetic materials in high density random access storage apparatus in operating modes about this well-defined transition to accomplish the storage of information.

A more specific object of the invention is to provide information storage apparatus which operates about an abrupt transition in the magnetic properties of the apparatus in response to the combined effects of temperature and magnetic forces.

Another specific object of the invention is to provide cryomagnetic information storage apparatus operable about a sharp transition in the coercivity characteristics of the apparatus in response to the combined effects of temperature and magnetic forces.

Briefly, these objects are accomplished in a random access information storage system of the non-destructive type. The system utilizes a recording unit of ferromagnetic material having predetermined levels of a magnetic parameter dependent on the level of an applied environmental force. Information is stored by operating the unit between these predetermined levels. At the same time, the unit is subjected to a magnetic field at a level between the predetermined levels. It is also biased at a predetermined level of the environmental force below the level necessary to effect a sharp transition in the level of the magnetic parameter. The environmental force is applied at a selected location of the unit causing the level of the magnetic parameter to switch abruptly enabling the applied magnetic field to accomplish the storage of information.

A feature of the invention provides for the recording unit to be in tape form having ferromagnetic material deposited on a substrate. The tape is subjected to an externally applied magnetic field at a recording station. The field has a coercive force between the operating levels of coercivity of the material when measured against varied levels of temperature. A highly focused beam of electrons is selectively concentrated in a predetermined or random manner at regions on the tape to increase the temperature of the material. At the material's critical transition temperature, the coercivity properties of the material are abruptly altered at that region. Information which may be read out magneto-optically or by electron beam techniques, is stored at that region by the action of the applied magnetic field.

Another feature of the invention provides for a sheet of magnetic material to be disposed contiguous to a grid of wires so that by application of electric current to respective ones of the wires, the temperature of the material is raised at a particular region and the coercivity properties of the sheet are altered to permit the recording of information at that region.

The foregoing and other objects, features and advantages of the invention will be apparent from the following more particular description of preferred embodiments of the invention, as illustrated in the accompanying drawing, wherein.

Figure 1:
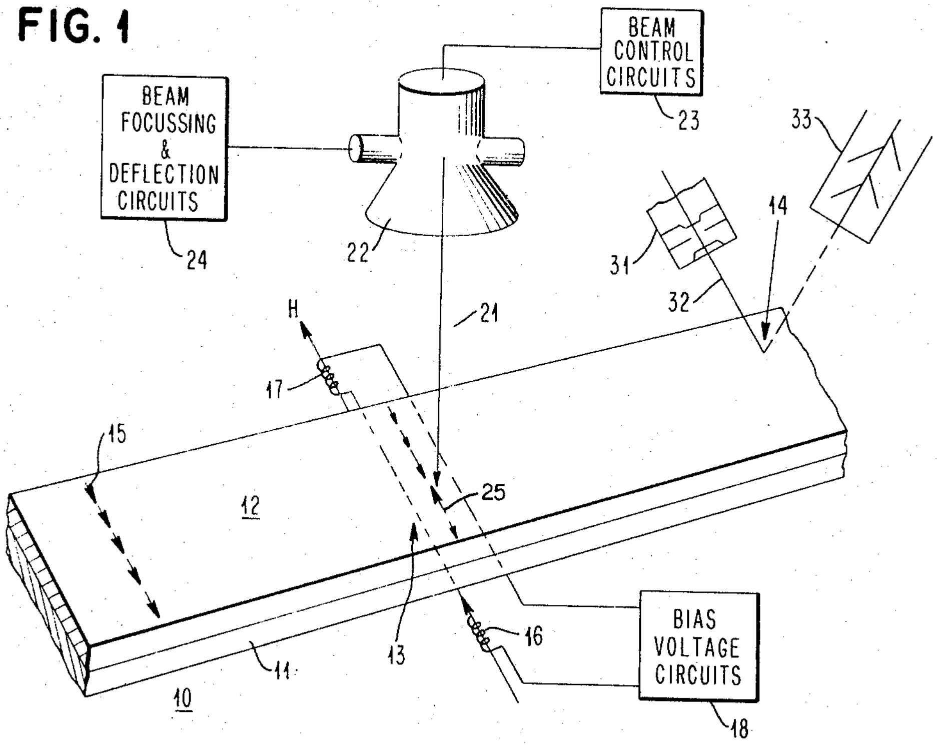
FIGURE 1 is a schematic diagram of an information storage system according to the principles of the invention.

Referring now to FIG. 1, a cryomagnetic information storage system embodying the principles of the invention employs a magnetic information storage media, generally indicated at 10. Media 10 is in tape form. It includes a layer of ferromagnetic material 12 deposited by conventional methods on a non-magnetic carrier 11.

Since the thickness is not critical, material 12 may be between a few microinches to a few inches in thickness. An appropriate thickness would be approximately 2 to 20 microinches. The carrier 11 should be reasonably smooth and stable in the temperature ranges of operation. One such material is a conventional cellulose acetate film of 1 to 5 mils thickness. The ferromagnetic surface could also take the form of a polycrystalline structure or a single crystal slab measuring approximately 2" x 2" x .01". It could also be formed as an agglomerate of separate multi-domain particles.

Figure 2:
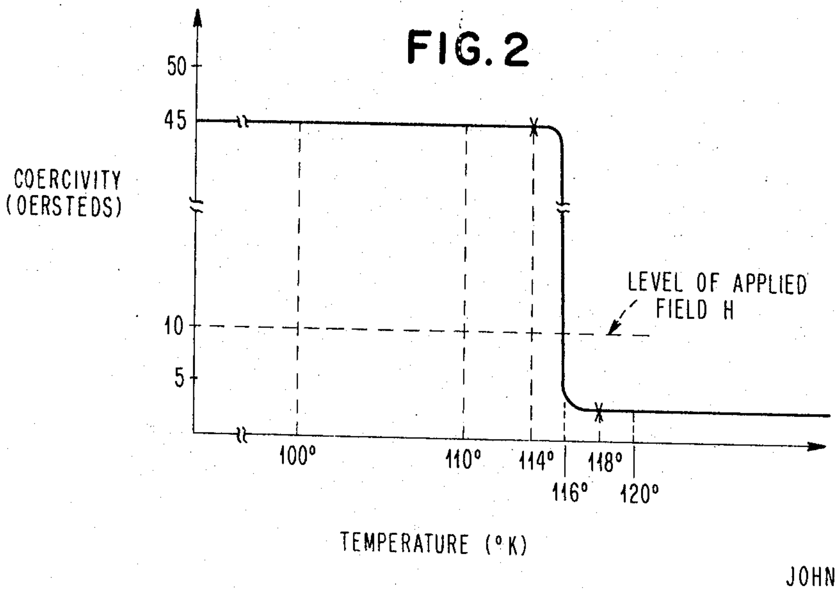
FIGURE 2 is a graphical plot illustrating the temperature versus coercivity properties of the magnetic material employed in the system of FIG. 1.

Ferrous ferrite ($FeO$, $Fe_2O_3$) is an example of one magnetic material having properties suitable for use in the storage apparatus of this invention. As shown in FIG. 2, the temperature in degrees Kelvin is plotted against the coercivity in oersteds for this material. The material has a substantially constant coercivity of approximately 45 oersteds until the operating temperature reaches about 116° Kelvin. At this temperature the coercivity changes abruptly and sharply to a value of about 3 oersteds. For purposes of this invention, an abrupt or sharp change is defined as one which occurs over not more than a 10° Kelvin temperature range. The coercivity continues at the level of 3 oersteds as the operating temperature is increased beyond 116° Kelvin. It is this property of abrupt change in the value of a magnetic parameter with the alteration of an applied environmental force which is employed to accomplish the storage of information in a recording system.

Referring again to FIG. 1, the tape medium 10 moves relatively quickly past a recording station 13 and then past a reading station 14. Under ordinary circumstances, the magnetic domains of the material 12 are oriented in one direction. As shown at 15, they are uniformly magnetized in a direction opposite to the bias field H. At the recording station 13, they are subjected to the magnetic bias field H, in the same plane as the plane of the tape media, but in a direction which is transverse to that of the tape. The magnetic field may be a DC field generated by a pair of Helmholtz coils 16, 17 positioned on opposite sides of the tape. The coils are energized from bias voltage circuitry generally indicated at 18.

Although the magnetic field is shown as being applied in a direction transverse to that of the tape, it could be applied in any of the six Cartesian directions. As shown in FIG. 2, this field H exerts a constant level of magnetic bias on the magnetic material 12 of the tape. The level of the bias is between the discrete operating levels of the ferromagnetic material 12. The field is not sufficient to cause a transition of the magnetic domains when the storage system is operating in the steady state condition. However, as shown in FIG. 2, a sharp and abrupt transition occurs in the coercivity characteristics of the material 12, when the temperature of a discrete location or region exceeds the transition temperature of 116° Kelvin. The action of the field H is then sufficient to switch the magnetization direction of that location in a manner indicative of the stored information.

In the storage system of FIG. 1, heat is supplied by a beam of electrons 21 generated by an electron gun 22 having appropriate beam control circuits 23 and beam focusing and deflecting circuits 24. As shown, the beam of the electrons 21 is directed at the domain of the location 25. The temperature level is elevated above the transition level of 116° Kelvin. The coercivity characteristics of the material abruptly change to a value below the level of the field H. The level of the field is sufficient to orient the magnetic domain of location 25 in the direction of the field, thereby storing information at that domain location.

In the operation of the storage system, it is desirable to accomplish the storage of information by altering the temperature of the material only a few degrees. Thus, the entire recording system may be disposed in a suitable cooling means (not shown). The material 12 would be biased at a temperature just below the transition temperature, for example 114° Kelvin. When the electron beam provides heat, a slight increase in temperature occurs at the selected location causing the temperature threshold of the material to be exceeded. Thus, if the temperature is increased about 4° from 114° to 118°, information storage is accomplished.

This storage may be performed according to a predetermined or random pattern by controlling the circuitry 24. After the beam is removed from the selected location, the coercivity level reverts back to its upper level. However, the locations retain the desired magnitude and sense of magnetization indicative of the stored information. Stability of the magnetic parameter is present at temperatures below the transition temperature, as a magnetic field approaching 50 oersteds is required to erase the particular stored information.

Although the magnetic field at the recording station 13 is described as being applied by a pair of Helmholtz coils 16, 17, it is readily apparent that it may be applied in other ways, and the invention is not limited to the use of Helmholtz coils. In addition, the magnetic field is not required to be of the DC type. It may be an AC field. In such a case, the magnetic domains 15 of the tape are initially magnetized in one direction at a pre-recording station. The AC field is used to demagnetize the regions or locations selected by the electron beam. The demagnetized regions would then store the information. To erase this information, the electron beam would have to be reapplied at selected regions and the tape again subjected to the magnetic field.

After recording the information, the storage media may be stored for subsequent read-out or the read-out may occur immediately thereafter. In FIG. 1, the tape is shown as passing a station 14 where the Kerr effect is employed for read-out of the information. A source of light 31 provides a beam 32 that is directed at the tape as it passes the reading station 14. By using detector 33 to measure the light reflections, which depend on the magnitude and sense of the magnetization, an indication is provided of the information stored on the tape.

If the tape transmits light, the Faraday effect for measuring deflections of the light passing through the tape may be used for read-out purposes. In addition, the read-out system may employ electron beam techniques for read-out. The source of the electron beam may be the same as the beam employed for writing or it may be a different source. The measurements may be made by either electron mirror techniques or those of Lorentz microscopy.

Figure 3:
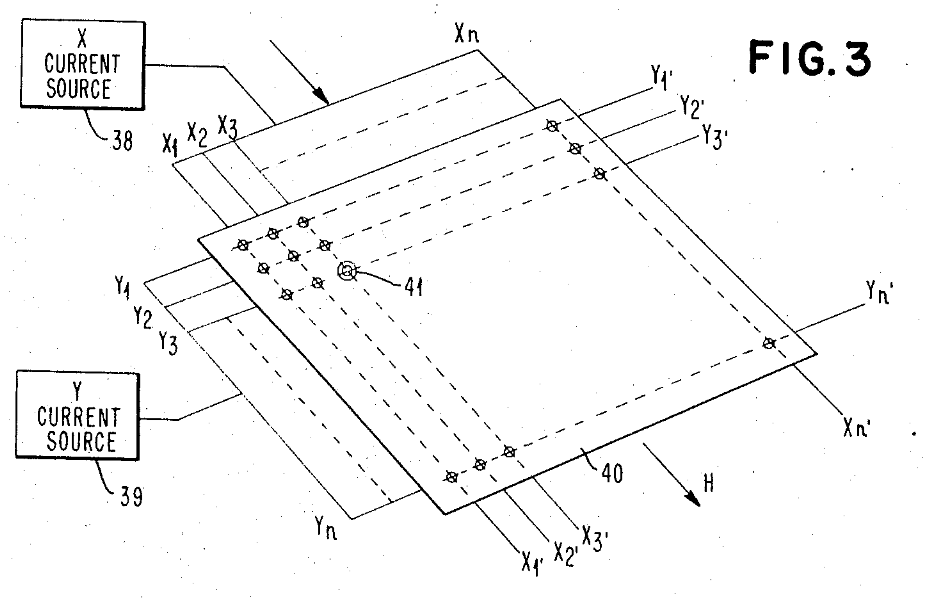
FIGURE 3 is an alternate embodiment of a storage system according to the invention.
Figures 4A, 4B:
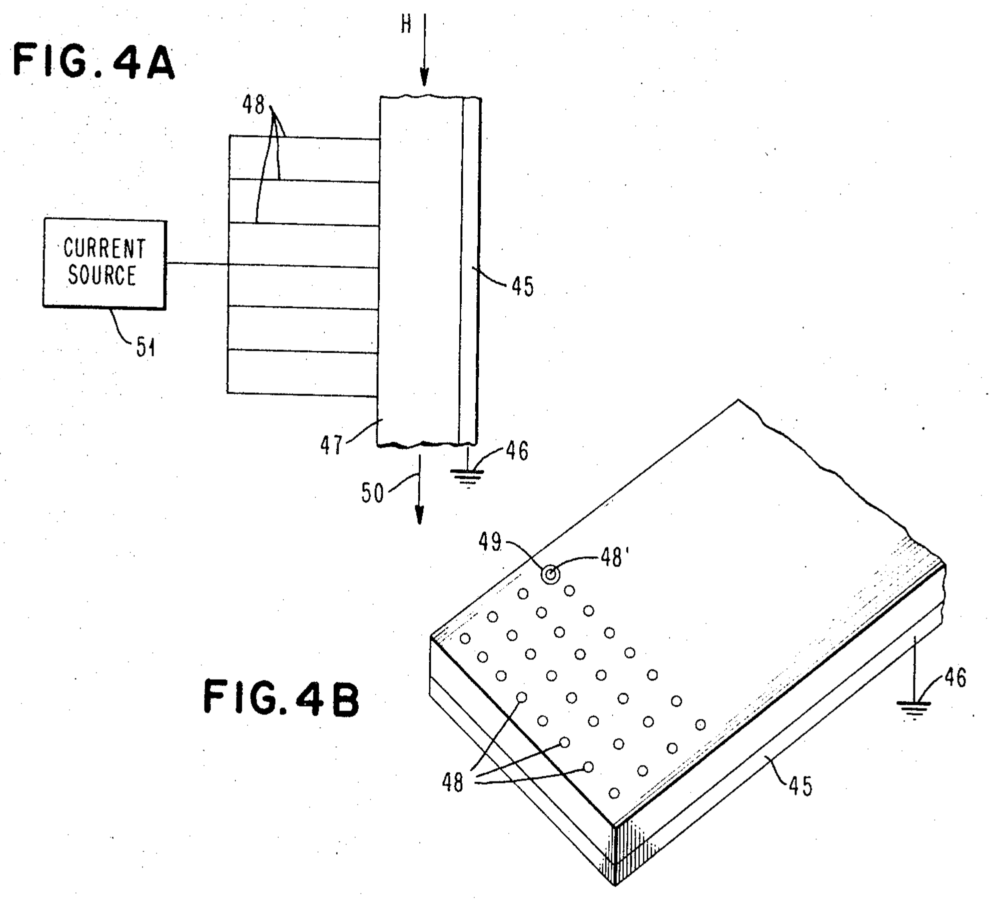
FIGURES 4A and 4B are another embodiment of a storage system according to the invention.

Referring now to FIG. 3, the storage unit 40 is illustrated as being in sheet form. As previously stated, the sheet may measure about 2" x 2" x .01". Information storage is accomplished at a desired location in sheet 40, for example 41, by employing coincident current techniques. Electric current is supplied from sources 38, 39 through conductors affixed to the sheet or formed as an integral part of it. For example, when an electric current is supplied along conductor X3–X3′ and a similar current is supplied along the conductor Y3–Y3′, sufficient heat results at the location 41 to cause the transition temperature of the magnetic material at this location of sheet 40 to be exceeded. Due to the action of the applied magnetic field H, the magnetic domain at location 41 is oriented to store information in the storage apparatus.

An additional embodiment of the invention, illustrating a further way for supplying heat to the storage apparatus for accomplishing information storage, is shown in FIGS. *4a* and *4b*. In this embodiment, the magnetic material 47 of the storage apparatus is mounted on a transparent conducting plate 45 which is connected to a source of reference potential at 46. The magnetic material 47 has conductors 48 affixed to the media in a direction normal to the plane of the storage apparatus. When electric current of a predetermined magnitude is supplied from a source 51 to a selected conductor 48′, Joule heating occurs at the location 49. The magnetic field, H, provided at 50 causes the magnetic domain at location 49 to be oriented to store the information.

The cryomagnetic storage apparatus of the invention has been described as requiring a magnetic material having a sharp or abrupt transition in its magnetic characteristics when subjected to a varied externally applied temperature. The heat required for exceeding the temperature transition level of the material may be supplied in a number of ways to permit the density of storage to be considerably higher than that available from conventional storage apparatus. These densities approximate $10^7$ bits/square inch. The time required for accessing a desired storage location is approximately 1 microsecond.

Although the invention has been described as employing a change in the coercivity properties of the magnetic material to accomplish information storage, it is to be understood that the principles of the invention may be utilized with other parameters. Thus, it is known that the magnetization, conductivity, specific heat, crystalline structure and lattice parameter are all sharply altered with the application of heat. Any one of these parameters may be used to accomplish the storage of information. In addition, the external force is not required to be the temperature parameter, but may also be externally applied pressure, stress or radiation.

While the invention has been particularly shown and described with reference to preferred embodiments thereof, it will be understood by those skilled in the art that various changes in form and details may be made therein without departing from the spirit and scope of the invention.

What is claimed is:

1. Storage apparatus for recording information as discrete magnetic manifestations in a ferrous ferrite medium, comprising:

ferrous ferrite storage media having a sharp reversible transition about a well defined temperature level defining first and second discrete levels of coercivity, said well defined temperature level for ferrous ferrite being approximately 116° Kelvin, said media normally operating at the first discrete level;

magnetic field means for subjecting the media to a level of coercive force between the discrete levels, so that when the media is at the second discrete level of coercivity, the field means affects a stable alteration in the magnetic manifestations of the media indicative of the recorded information;

cooling means for establishing a thermal environment for said ferrous ferrite storage media, said thermal environment being maintained at a temperature of approximately 114° Kelvin; and heat imparting means for selectively concentrating heat at discrete locations of the media to affect the transition about the well defined temperature level, bringing the affected media to the second discrete level so that the magetic field means is effective to alter the magnetic manifestations of the media indicative of recorded information.

2. The apparatus of claim 1, wherein the heat imparting means comprises an electron gun operative by focusing and deflecting controls to direct a beam of electrons at the selected locations, so that the predetermined value of temperature is exceeded.

3. The apparatus of claim 1, wherein the heat imparting means comprises electrical conductor means which conduct electric current to heat the selected locations, so that the predetermined value of temperature is exceeded.

4. Information storage apparatus, comprising:

ferrous ferrite means for storing information as magnetic manifestations, the ferrous ferrite means having first and second discrete coercivity levels with a sharp reversible transition between the levels occurring at a predetermined transition temperature, said ferrous ferrite means being normally maintained at the first level of coercivity;

means for briefly applying heat at a selected discrete location on the ferrous ferrite means sufficient to cause abrupt transition in coercivity levels to occur and thus place the selected location at the second discrete level of coercivity;

means for substantially simultaneously subjecting the ferrous ferrite means, including the location of the ferrous ferrite means which is at the second level of coercivity, to a magnetic force, which force serves to alter only the magnetic manifestation indicative of information at that location of the ferrous ferrite means which is at the second level of coercivity;

cooling means for establishing a thermal environment for said ferrous ferrite means, said thermal environment being maintained at a temperature in the range of 100° Kelvin to 150° Kelvin, and at several degrees below the transition temperature;

whereby, upon removal of the applied heat, the coercivity returns to the first operating level while the altered magnetic manifestation indicative of information retains its altered character.

5. Information storage apparatus, comprising:

ferrous ferrite storage means for storing information as discrete magnetic manifestations, said means having first and second discrete levels of coercive force with a sharp reversible transition between the levels occurring at a transition temperature, said ferrous ferrite means normally operating at the first level and said ferrous ferrite means being of the group which includes FeO, $Fe_2O_3$;

electron beam means for briefly imparting heat to a selected discrete portion of the magnetic storage means sufficient to cause the transition temperature to be reached and thus place the magnetic means at such heat portion at the second discrete operating level;

magnetic field means for substantially simultaneously subjecting the ferrous ferrite means, including the portion which is at the second discrete operating level to a magnetic field having a value of coercive force between the first and second level of coercive force of the ferrous ferrite storage means, the magnetic field means being effective to alter only the magnetic manifestations of the ferrous ferrite storage means which is at the second operating level in a manner indicative of the information stored; and cooling means for establishing a thermal environment for said ferrous ferrite means, said thermal environment being maintained at a temperature of approximately 114° Kelvin which is below said transition temperature;

whereby, upon removal of the imparted heat, the coercive force of the ferrous ferrite storage means returns to the first operating level while the altered magnetic manifestation indicative of information retains its altered character.

References Cited

UNITED STATES PATENTS

| | | | |
|---|---|---|---|
| 2,738,383 | 3/1956 | Herr | 346—74 |
| 2,915,594 | 12/1959 | Burns | 179—100.2 |
| 3,176,278 | 3/1965 | Mayer | 346—74 |
| 3,196,206 | 7/1965 | Griffiths | 340—174.1 |
| 3,213,206 | 10/1965 | Zworykin | 179—100.2 |
| 3,245,062 | 4/1966 | Kornei | 346—74 |
| 3,312,979 | 4/1967 | Della Torre | 346—76 |
| 3,094,699 | 6/1963 | Supernowicz | 346—74 |
| 3,164,816 | 1/1965 | Chang | 340—173 |

BERNARD KONICK, *Primary Examiner.*

L. J. SCHROEDER, *Assistant Examiner.*

U.S. Cl. X.R.

117—235; 179—100.2; 340—174.1; 346—1